(12) United States Patent
Andersen et al.

(10) Patent No.: US 8,464,342 B2
(45) Date of Patent: Jun. 11, 2013

(54) ADAPTIVELY SELECTING ELECTRONIC MESSAGE SCANNING RULES

(75) Inventors: Hans Christian Andersen, Seattle, WA (US); Anatoliy Panasyuk, Bellevue, WA (US); Venkata Somanadha Sarma Remany, Sammamish, WA (US); Bart Kus, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 173 days.

(21) Appl. No.: 12/872,691

(22) Filed: Aug. 31, 2010

(65) Prior Publication Data
US 2012/0054858 A1 Mar. 1, 2012

(51) Int. Cl.
*H04L 29/06* (2006.01)
(52) U.S. Cl.
USPC .......................................................... 726/22
(58) Field of Classification Search
USPC ..................... 726/22; 713/168, 170; 709/206
See application file for complete search history.

(56) References Cited

U.S. PATENT DOCUMENTS

| 6,161,130 | A | 12/2000 | Horvitz et al. | |
|---|---|---|---|---|
| 6,421,709 | B1 | 7/2002 | McCormick et al. | |
| 6,829,613 | B1 * | 12/2004 | Liddy ............................ | 707/694 |
| 7,543,053 | B2 | 6/2009 | Goodman et al. | |
| 7,574,524 | B2 | 8/2009 | Bantz et al. | |
| 7,600,126 | B2 | 10/2009 | Bolosky | |
| 7,617,285 | B1 | 11/2009 | Hartmann | |
| 7,725,544 | B2 | 5/2010 | Alspector | |
| 2004/0167964 | A1 * | 8/2004 | Rounthwaite et al. ........ | 709/206 |
| 2004/0177110 | A1 | 9/2004 | Rounthwaite | |
| 2005/0081059 | A1 * | 4/2005 | Bandini et al. ................. | 713/201 |
| 2006/0168055 | A1 * | 7/2006 | Wixted et al. ................. | 709/206 |
| 2008/0239951 | A1 | 10/2008 | Strom | |
| 2009/0138945 | A1 | 5/2009 | Savchuk | |
| 2009/0300765 | A1 | 12/2009 | Moskovitch et al. | |
| 2009/0307771 | A1 | 12/2009 | Rajan | |
| 2009/0319629 | A1 | 12/2009 | de Guerre et al. | |
| 2010/0195503 | A1 * | 8/2010 | Raleigh ......................... | 370/235 |
| 2012/0054859 | A1 | 3/2012 | Andersen | |

FOREIGN PATENT DOCUMENTS

WO    WO2005057326    6/2005

OTHER PUBLICATIONS

Net Sense, "Spam Solutions White Paper", Dec. 2006, pp. 1-34.
Abm Shawkaht Ali and Yang Xiang, "Spam Classification Using Adaptive Boosting Algorithm", 6th IEEE/ACIS International Conference on Computer and Information Science (ICIS 2007), 2007, 5 pages.

(Continued)

*Primary Examiner* — Gilberto Barron, Jr.
*Assistant Examiner* — David Le
(74) *Attorney, Agent, or Firm* — Workman Nydegger (57) ABSTRACT

The present invention extends to methods, systems, and computer program products for adaptively selecting electronic message scanning rules. Embodiments of the invention relate to dynamically (and potentially unpredictably) varying the depth/thoroughness of classifying electronic messages to protect against undesirable message content (e.g., SPAM, viruses, digital leakage, etc.). A minimum effectiveness is maintained and, when available resources permit, can be exceeded to provide increased protection. An optimal subset of available message classification rules can be selected on a per message basis. The selection of rules is based on available system resources, minimum desired effectiveness (e.g., defined in a Service Level Agreement ("SLA")), and rule characteristics. Feedback loops can be used to optimize selected classification rule subsets.

20 Claims, 7 Drawing Sheets

OTHER PUBLICATIONS

Kagstrom, Jon, "Improving Naive Bayesian Spam Filtering", Mid Sweden University, Department of Information Technology and Media, Spring 2005, 68 pages.

Cormack and Lynam, "On-line Supervised Spam Filter Evaluation", University of Waterloo, Nov. 3, 2006.

Office Action dated Oct. 9, 2012 cited in U.S. Appl. No. 12/872,728.

Office Action dated Mar. 28, 2013 cited in U.S. Appl. No. 12/872,728.

* cited by examiner

ADAPTIVELY SELECTING ELECTRONIC MESSAGE SCANNING RULES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In many computing environments, electronic messages, such as, for example, email messages, are used to legitimately exchange information between computer system users. However, these computing environments also subject users to unsolicited and/or unwanted electronic messages, often referred to as SPAM. Many different technologies have been developed to scan for and block SPAM.

SPAM scanning technologies must typically negotiate a set of metrics, including: effectiveness, accuracy, efficiency, and latency. Effectiveness relates to what extent SPAM can be identified and stopped. Accuracy relates to what extent legitimate messages are incorrectly identified as SPAM (e.g., rate of false positives). Efficiency relates to resource consumption associated with identifying a message as SPAM or legitimate. Latency relates to how much time is each individual message delayed in transit as a result of scanning.

Balancing between these metrics can be a relatively complex task as improvement in one area typically means degradation in one or more other areas. For example, more aggressive anti-SPAM detection (increased effectiveness) can lead to higher false positives (reduced accuracy), and/or higher CPU load due to the more complex processing algorithms (increased resource consumption).

Additionally, some combination of these metrics is often mapped to Service Level Agreements ("SLAs") a service provider is supporting. For example, an anti-SPAM service provider can agree to support effectiveness no lower than X, accuracy no lower than Y., etc. Compromising the terms of a SLA, for example, having effectiveness less than X for some amount of time, may subject the anti-SPAM service provider to some monetary refund to the customer.

However, at the same time, anti-SPAM services typically experience high variability of the system load. For example, throughout any given day, on weekends, and seasonally, the volume of SPAM and/or the volume of legitimate electronic messages can fluctuate. Unfortunately this can lead to service providers over provisioning. For example, a common design pattern is to build a scanning service with sufficient power to guarantee an SLA at peak load time, which may be three to five times higher than average load.

In practice, designing for peak load results in resources being (potentially severely) underutilized a significant portion of the time. Scanning typically includes a fixed number of stages and/or the use of a fixed number of scanning rules with limited, if any, consideration for available resources. Thus, at non-peak times, the fixed number of stages and/or rules are used to scan a message, even if resources are available for further scanning. As such, designing for peak load is undesirable form a cost of goods sold perspective but is nonetheless required in order to SLAs Further complications can occur when supporting various different levels of service, such as, for example, regular customers, premium customers, low-cost customers, etc., each typically with different metrics defined in their SLA. Often, premium service offerings come with SLAs that guarantee a higher level of service (e.g., increased accuracy, less latency, etc.) requiring more compute/processor resources on the part of the service provider.

One design pattern for handling different levels of service is to us one common anti-SPAM service for all levels of service. Each level of service is limited to a number of rules and/or processing stages a message goes through based on a required SLA. For example, a premium customer's e-mail may go through ten stages of processing, while basic-customer's e-mail may go through only five stages of processing. The cost of servicing basic customers is reduced at the expense of lower quality of scanning (e.g., reduced effectiveness), even when resources for further scanning may be available. In addition to the lower quality of scanning, basic customers are also more vulnerable to targeted attack by exploiting weaknesses in the level of protection provided for basic customers (predictability of the system)

Another common pattern is to setup two separate systems, one for premium customers and another one for the basic customers. Each system is designed to balance quality of service and the cost of service according to the type of customer. Unfortunately, this type of system requires duplicate infrastructure, leading to higher overall costs, as well as the general problem of over-provisioning in order to meet SLA at the peak load.

BRIEF SUMMARY

The present invention extends to methods, systems, and computer program products for adaptively selecting electronic message scanning rules. In some embodiments, rules used to classify electronic messages are adaptively selected. One or more electronic messages are received. For each of the one or more electronic messages, each message classification rule in a previously selected subset of electronic message classification rules is applied to the electronic message. The previously selected subset of electronic message classification rules is a subset of a plurality of available electronic message classification rules.

For each electronic message classification rule in the previously selected subset of electronic message classification rules, a result indicating a likelihood of the electronic message having a specified message characteristic is calculated. A resource cost, indicating an amount of resources consumed to apply the electronic message classification rule to the electronic message, is calculated. The calculated result and the measured resource cost associated with applying each electronic mail classification rule to each electronic message are retained.

For each message classification rule in the previously selected subset of message classification rules, an efficiency metric is synthesized from the retained calculated results and measured resource costs for the message classification rule. The synthesized efficiency metrics are compared to existing efficiency metrics for electronic message classification rules included in the plurality of available electronic message classification rules. A new subset of electronic message classification rules is selected, from among the plurality of available electronic message classification rules, based at least in part on results of comparing the synthesized efficiency metrics to existing efficiency metrics. The new subset of electronic message classification rules is for use in classifying subsequently received electronic messages. Accordingly, message classification rules can be rotated into and out use to adapt to changing message content patterns.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for adaptively selecting electronic message scanning rules. In some embodiments, rules used to classify electronic messages are adaptively selected. One or more electronic messages are received. For each of the one or more electronic messages, each message classification rule in a previously selected subset of electronic message classification rules is applied to the electronic message. The previously selected subset of electronic message classification rules is a subset of a plurality of available electronic message classification rules.

For each electronic message classification rule in the previously selected subset of electronic message classification rules, a result indicating a likelihood of the electronic message having a specified message characteristic is calculated. A resource cost, indicating an amount of resources consumed to apply the electronic message classification rule to the electronic message, is calculated. The calculated result and the measured resource cost associated with applying each electronic mail classification rule to each electronic message are retained.

For each message classification rule in the previously selected subset of message classification rules, an efficiency metric is synthesized from the retained calculated results and measured resource costs for the message classification rule. The synthesized efficiency metrics are compared to existing efficiency metrics for electronic message classification rules included in the plurality of available electronic message classification rules. A new subset of electronic message classification rules is selected, from among the plurality of available electronic message classification rules, based at least in part on results of comparing the synthesized efficiency metrics to existing efficiency metrics. The new subset of electronic message classification rules is for use in classifying subsequently received electronic messages. Accordingly, message classification rules can be brought into and taken out of service to adapt to changing message content patterns.

In other embodiments, electronic messages are adaptively classified. An electronic message, sent from a sender to a recipient, is received at a specified time. A level of service applicable to received electronic message is identified based on one or more of: the sender and the recipient.

The level of service defines at least a minimum effectiveness value and a set of maximum cost values for scanning electronic messages. The minimum effectiveness value represents the minimum cumulative total effectiveness that a combination of message classification rules is to have to satisfy the level of service. Each maximum cost value in the set of maximum cost values corresponds to a different designated period of time and represents a total amount of resources that can be used to apply message classification rules to an electronic message. A maximum cost value, from among the set of maximum cost values, is selected for use when scanning the received electronic message based on the specified time being within the designated period of time for selected maximum cost value.

One or more message classification rules are applied to the received electronic message. Each message classification rule has a measured effectiveness, a measured resource cost, and a calculated efficiency based on the measured effectiveness in view of the measured resource cost. The measured effectiveness represents a probability of appropriately identifying an electronic message as having a specified message characteristic. The one or more message classification rules are applied in order of efficiency until the minimum cumulative total effectiveness defined in the level of service is achieved.

Each message classification rule is applied to the electronic message to generate a result indicating a likelihood of the electronic message having the specified message characteristic. The measured resource cost for the applied message classification rule is added to a cumulative amount of consumed resources. The cumulative amount of consumed resource is calculated by summing the measured resource costs from previously applied message classification rules in the one or more message classification rules.

It is determined if the cumulative amount of consumed resources is less than the selected maximum cost value. Additional message classification rules are applied to electronic messages based on the determination. When the amount of consumed resources is less than the selected maximum cost value, more electronic message rules are applied to the received electronic message resulting in effectiveness above that defined in the level of service. When the amount of consumed resources is at least equal to the selected maximum cost value, electronic message rules are applied to another different electronic message.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, embodiments of the invention relate to dynamically (and potentially unpredictably) varying the depth/thoroughness of classifying electronic messages to protect against undesirable message content (e.g., SPAM, viruses, digital leakage, etc.). A minimum effectiveness is maintained and, when available resources permit, can be exceeded to provide increased protection. An optimal subset of available message classification rules can be selected on a per message basis. The selection of rules is based on available system resources, minimum desired effectiveness (e.g., defined in a Service Level Agreement ("SLA"), and rule characteristics. Feedback loops can be used to optimize classification rule subsets.

As such, within the specification and following claims, "message classification" includes classifying electronic messages (e.g., electronic mail messages, Short Message Service ("SMS") messages, files, etc.) into different "classes" based on message (or file) characteristics, such as, for example, content, message size, attachments, business vs. consumer domains, region of origin, sender, recipient, time, date, etc.

In some embodiments, an electronic message is classified to determine a level of service (e.g., in accordance with a SLA) corresponding to the electronic message. The level of service defines the further application of message classification rules to the electronic message. A level of service can define what types of and how many other message classification rules are to be applied to the electronic message. For example, classification rules that are very effective to classify messages in one country may be less effective to classify messages in another country and vice-versa.

In some embodiments, further classification relates to determining whether or not an electronic message is an unwanted and/or unsolicited electronic message (e.g., SPAM), whether an electronic message contains malware or is otherwise infected and/or dangerous (e.g., viruses, spyware, Trojan horses, etc.), whether sensitive information is being leaked in an electronic message, etc. For example, a digital leakage prevention ("DLP") system can use rules to determine whether or not an electronic message includes sensitive information.

Figure 1:
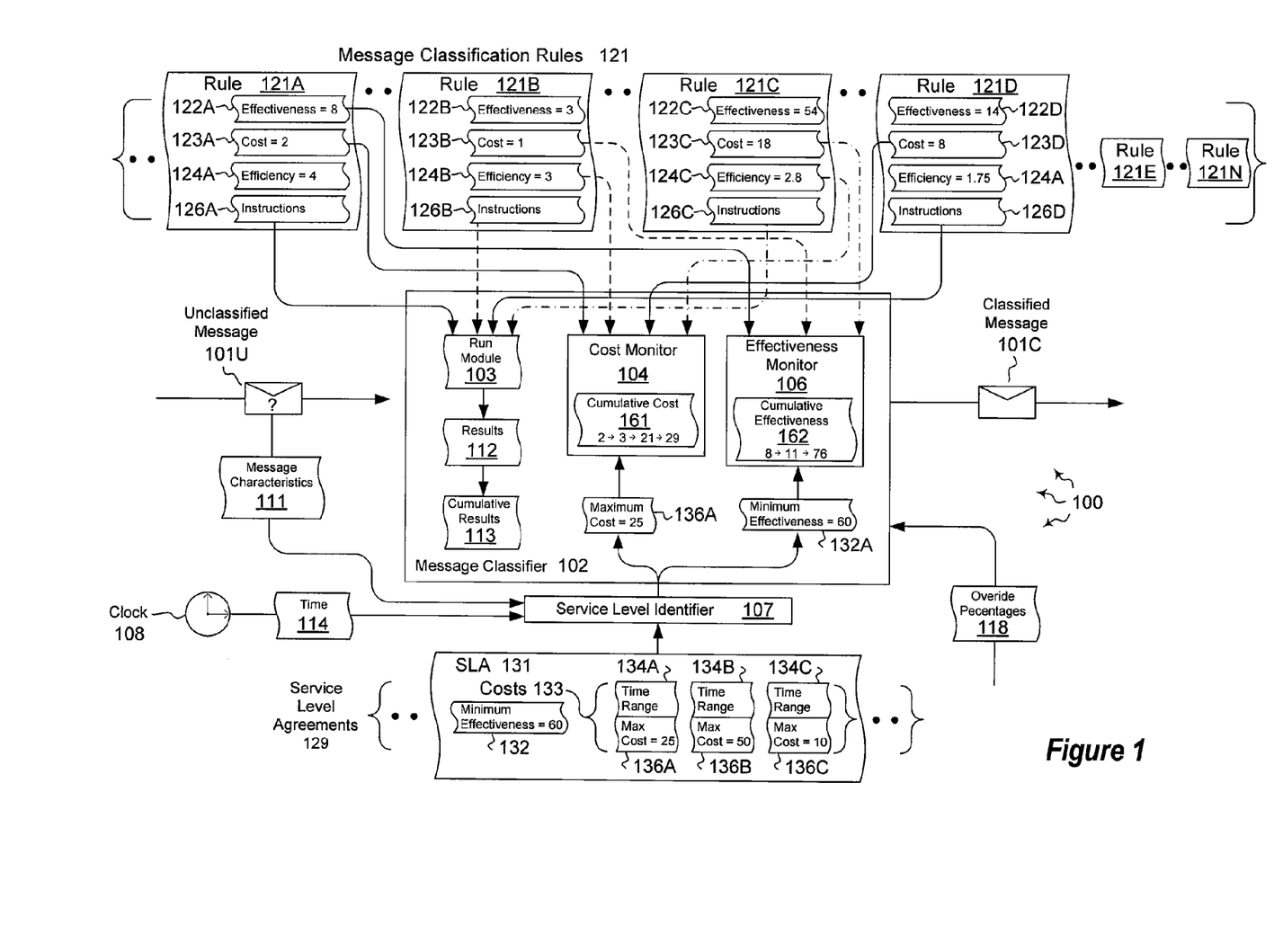
FIG. 1 illustrates an example computer architecture that facilitates adaptively classifying an electronic message.

FIG. 1 illustrates an example computer architecture 100 that facilitates adaptively classifying an electronic message. Referring to FIG. 1, computer architecture 100 includes message classifier 102, service level identifier 107, clock 108, override percentage 118, message classification rules 121, and service level agreements 131. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Rules 121 contains a plurality of message classification rules, such as, for example, rules 121A through 121N, which can be used to classify electronic messages. Each rule can indicate an effectiveness, cost, efficiency, and can include instructions. The effectiveness indicates how likely the rule is to accurately identify a message as somehow undesirable based on the type of scanning being utilized. For example, the effectiveness of a rule for detecting SPAM, can indicate how likely the rule is to detect SPAM without false positives. The cost indicates an (e.g., estimated) amount of system resources that are consumed when run module runs instructions of the rule. Efficiency indicates how efficient a rule is based on effectiveness in view of resource consumption. In some embodiments, efficiency is the quotient of effectiveness divided by cost. Instructions are executed to generate a result related to classifying an electronic message (e.g., to determine whether or not an electronic message is SPAM, contains malware, contains sensitive information, etc.).

Generally, message classifier 102 is configured to classify electronic messages based on electronic message characteristics. As depicted, message classifier 102 includes run module 103, cost monitor 104, and effectiveness monitor 106. Run module 103 is configured to run instructions (e.g., scripts or other executable code) included in a received rule. The instructions produce an individual result that can be used as a data point to classify an electronic message. For example, an individual result can indicate whether or not an electronic message is an unwanted and/or unsolicited electronic message (e.g., SPAM), is infected or dangerous, contains sensitive information, etc. Run module 103 can accumulate individual results from running a number of different rules. Message classifier 102 can then use the accumulated individual results to classify a message.

Cost monitor 104 is configured to track the ongoing resource cost associated with scanning an electronic message. As rules are run, cost monitor 104 maintains a total resource cost for any rules run against an electronic message. In some embodiments, as each rule is run, the cost for the rule is added to the resource cost for any previously run rules.

Effectiveness monitor 106 is configured to track the ongoing effectiveness of scanning an electronic message. As rules are run, effectiveness monitor 106 maintains a total effectiveness for any rules run against an electronic message. In some embodiments, as each rule is run, the effectiveness for the rule is added to the effectiveness for any previously run rules.

Service level agreements 129 contain a plurality of SLAs including SLA 131. Each SLA includes a minimum effectiveness and one or more costs. Each cost is applicable to a specified date/time range. The minimum effectiveness represents the cumulative effectiveness (i.e., the sum of effectiveness for a plurality of classification rules) that is to be achieved when scanning a message (even is resource consumption is exceeded). Table 1 table is an example of effectiveness per SLA based on customer type.

TABLE 1

| Customer Type | Minimum Effectiveness |
|---|---|
| Basic Customer | 75 |
| Premium Customer | 100 |

Table 1 indicates that the minimum effectiveness (i.e., the cumulative effectiveness resulting from the application of a plurality of classification rules) is 75 for a basic customer and 100 for a premium customer. Other factors can also be considered when assigning a minimum effectiveness in an SLA.

The one or more costs each include a time range and a maximum cost. Each time range/maximum cost pair represents that a maximum resource cost for applying rules is to be considered to a message when the message is received within the time range. Time range/maximum cost pairs can vary or be the same for different levels of service. In some embodiments, time range/maximum cost pairs are assigned in a commonly accessible table such that the time range/maximum cost pairs are the same for many SLAs. In other embodiments, time range/maximum cost pairs can be assigned on a per SLA basis, such as, for example, through inclusion in an SLA. Table 2 is an example of time range/maximum cost pairs.

TABLE 2

| Time of Day | Maximum Cost |
|---|---|
| Peak hours | 50 |
| Normal hours | 75 |
| Off-peak hours | 100 |

Table 2 indicates that the maximum resource cost for applying classification rules during peak hours is 50, during normal hours is 75, and during off-peak hours is 100. Other factors can also be considered.

Maximum costs may change over time. If a message classification server adds additional hardware, and thus has more computational capacity, the maximum cost figures may rise. On the other hand, if the service adds additional customers or if load suddenly increases, the maximum cost figure may decrease.

In some embodiments, minimum effectiveness is considered with more importance relative to maximum cost. In these embodiments, resources in excess of maximum cost can be consumed to insure that minimum effectiveness is achieved. If minimum effectiveness is achieved using fewer resources than the maximum cost, further classification rules can be applied to increase effectiveness until maximum cost is reached or exceeded.

Service level identifier 107 is configured to identify a level of service corresponding to a received electronic message. Based on message characteristics and time/date, service level identifier 107 can identifier an appropriate SLA from service level agreements 131. Clock 108 can maintain a date and time of day and send that information to service level identifier 107 when an electronic message is received. Service level identifier can send and minimum effectiveness and maximum cost for the message to message classifier 102. Per message classification rule, message classifier 102 can compare a cumulative effectiveness to the maximum effectives and a cumulative cost to the maximum cost to determine which and how many classification rules to apply to the received message.

Override percentage 118 defines some percentage that additional classification rules are to be applied to an electronic message even when minimum effectiveness is already achieved and maximum cost is already reached or exceeded. Override percentage 118 allows classification rules that might otherwise be skipped (e.g., due to their efficiency) to be executed from time to time. In some embodiments, override percentage 118 indicates a percentage that every rule in message classification rules 121 is to be applied to an electronic message.

Figure 3:
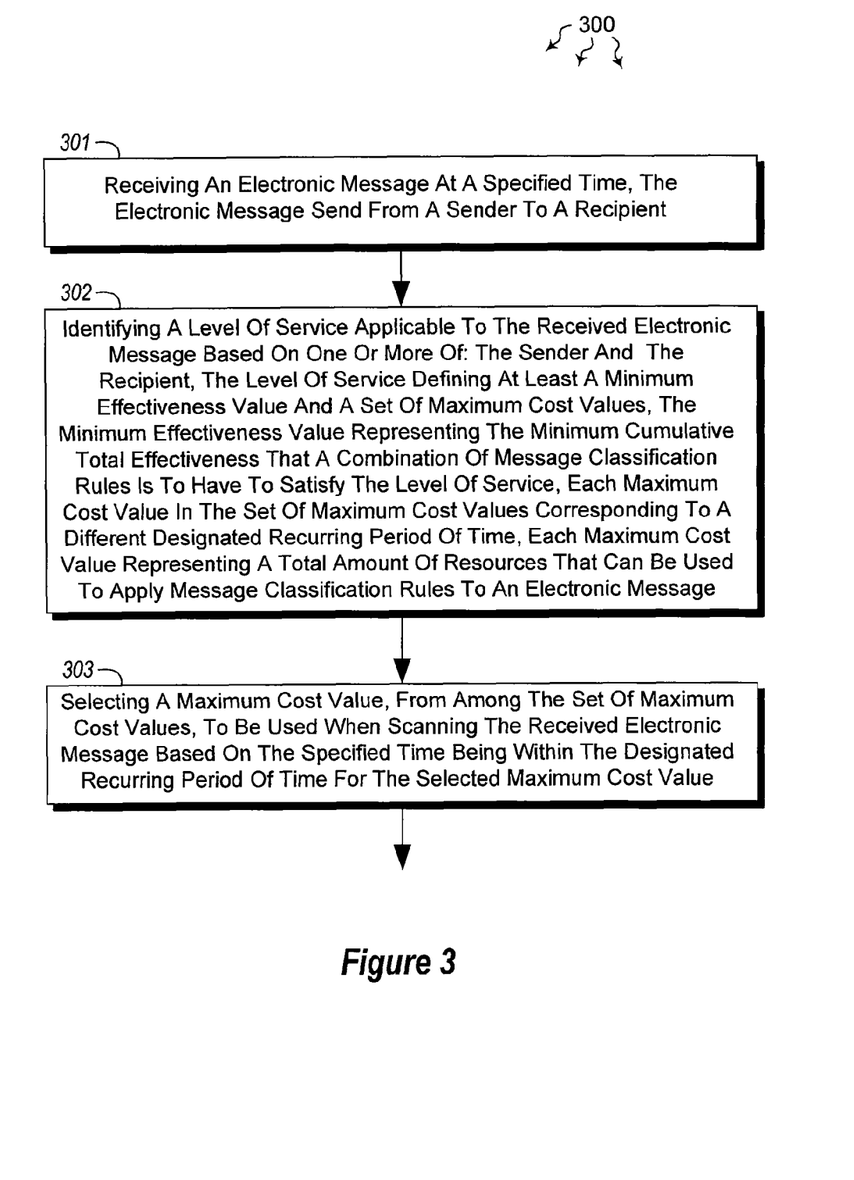
FIG. 3 illustrates a flow chart of an example method for adaptively classifying an electronic message.

FIG. 3 illustrates a flow chart of an example method 300 for adaptively classifying an electronic message. Method 300 will be described with respect to the components and data of computer architecture 100.

Method 300 includes an act receiving an electronic message at a specified time, the electronic message send from a sender to a recipient (act 301). For example, message classifier 102 can receive message 101U at time 114 (as indicated by clock 108). Message 101U can include message characteristics 111 including a sender address and a recipient address.

Method 300 includes an act of identifying a level of service applicable to the received electronic message based on one or more of: the sender and the recipient, the level of service defining at least a minimum effectiveness value and a set of maximum cost values, the minimum effectiveness value representing the minimum cumulative total effectiveness that a combination of message classification rules is to have to satisfy the level of service, each maximum cost value in the set of maximum cost values corresponding to a different designated period of time, each maximum cost value representing a total amount of resources that can be used to apply message classification rules to an electronic message (act 302). For example, service level identifier 107 can receive message characteristics 111 and time 114. Based on message characteristics 111, (e.g., the sender and/or recipient addresses) service level identifier 107 can identify a SLA 131 as applicable to classifying message 101U.

As depicted, SLA 131 defines minimum effectiveness 132 and costs 133. Costs 133 include time range/maximum cost pairs, including time range 134A/maximum cost 136A, time range 134B/maximum cost 136B, time range 134C/maximum cost 136C, etc.

Method 300 includes an act of selecting a maximum cost value, from among the set of maximum cost values, to be used when scanning the received electronic message based on the specified time being within the designated period of time for selected maximum cost value (act 303). For example, service level identifier 107 can determine that time 114 is within time range 134A. In response, service level identifier 107 can select maximum cost 136A to be used when scanning unclassified message 10U

Service level identifier 107 can send minimum effectiveness 132 and maximum cost 136A to message classifier 102. Message classifier 102, can use minimum effectiveness 132 and maximum cost 136A to determine when applying message classification rules to unclassified message 101U is to stop.

Method 300 includes an act of applying one or more message classification rules to the received electronic message, each message classification rule having a measured effectiveness, a measured resource cost, and a calculated efficiency based on the measured effectiveness in view of the measured resource cost, the measured effectiveness representing a probability of appropriately classifying electronic messages as having a specified message characteristic, the one or more message classification rules applied in order of efficiency until the minimum cumulative total effectiveness defined in the level of service is achieved (act 304). For example, message classifier can apply rules from rules 121 in order of efficiency until minimum effectiveness 132 (i.e., 60) is achieved.

Of the depicted rules, it may be that efficiency 124A (i.e., 4) is the highest for rules in rules 121. Thus, rule 121A is the first rule applied to unclassified message 101U. Upon applying rule 121A, cumulative effectiveness 162 is 8 equaling the effectiveness 122A. Message classifier 102 determines that 8 is less than 60 so further classification rules are to be applied to achieve minimum effectiveness 132A.

It may be that efficiency 124B (i.e., 3) is the next highest for rules in rules 121. Thus, rule 121B is the next rule applied to unclassified message 101U. Upon applying rule 121B, cumulative effectiveness 162 is 11 equaling the sum of the effectiveness 122A plus effectiveness 122B. Message classifier 102 determines that 11 is less than 60 so further classification rules are to be applied to achieve minimum effectiveness 132A.

It may be that efficiency 124C (i.e., 2.8) is the highest for rules in rules 121. Thus, rule 121C is the next rule applied to unclassified message 101U. Upon applying rule 121C, cumulative effectiveness 162 is 66 equaling the sum of the effectiveness 122A plus effectiveness 122B plus effectiveness 122C. Message classifier 102 determines that 66 is greater than 60 so further classification rules are not required to satisfy SLA 131.

For each of the applied one or more message classification rules, method 300 includes an act of applying the message classification rule to the electronic message to generate a result indicating a likelihood of the electronic message having the specified message characteristic (act 305). For example, run module 103 can execute instructions 126A against unclassified message 101U to generate result 112. Result 112 indicates a likelihood that unclassified message 101U is an unwanted and/or unsolicited electronic message, an infected or dangerous message, contains sensitive information, etc. Run module 103 can store results 112 in cumulative results 113. Instructions 126B and 126C can be similar executed against unclassified message 101U to generate results. These results can also be stored in cumulative results 113.

For each of the applied one or more message classification rules, method 300 includes an act of adding the measured resource cost for the applied message classification rule to a cumulative amount of consumed resources, the cumulative amount of consumed resource calculated by summing the measured resource costs from previously applied message classification rules in the one or more message classification rules (act 306). For example, upon applying rules 121A, 121B, and 121C cumulative cost 161 is 21 equaling cost 123A plus cost 123B plus cost 123C.

Method 300 includes an act of determining if the cumulative amount of consumed resources is less than the selected maximum cost value (act 307). For example, cost monitor 104 can determine if cumulative cost 104 is less than maximum cost 136A. Method 300 includes an act of an act of applying additional message classification rules to electronic messages based on the determination (act 308). For example, message classifier 102 can apply additional message classification rules to electronic messages based on whether or not cumulative cost 161 is less than maximum cost 136A.

As depicted in computer architecture 100, upon achieving minimum effectiveness 132A, cumulative cost 161 (i.e., 21) is less than maximum cost 136A (i.e., 25). Thus, additional classification rules can be applied to unclassified message 101U to increase the effectiveness of classifying unclassified message 101U.

For example, it may be that efficiency 124D (1.75) is the next highest for rules in rules 121. Thus, rule 121D is the next rule applied to unclassified message 101U. As such, run module 103 can execute instructions 126D against unclassified message 101U to generate a result and store the results in cumulative results 113. Upon applying rule 121D, cumulative cost 161 is transitioned to 29 equaling cost 123A plus cost 123B plus cost 123C plus cost 123D. (Effectiveness 122D is essentially ignored since minimum effectiveness 132A has already been achieved). Since cumulative cost 161 (i.e., 29) exceeds maximum cost 136A (i.e., 25), no further rules are applied to unclassified message 101U.

Alternately, if upon achieving minimum effectiveness 132A after application of rule 121C, cumulative cost 161 had equaled or was greater maximum cost 136A (i.e., 25), no further rules are applied to unclassified message 101U. However, minimum effectiveness 132A is still achieved.

When minimum effectiveness 132A is achieved and maximum cost 136A is reached or exceeded, messages classifier 102 can refer to override percentage 118. Message classifier 102 can use override percentage 118 to determine if further classification rules are to be applied to unclassified message 101U. If so, message classifier 102 applies one or more (or all remaining) rules from message classification rules 121, such as, for example, rule 121E, to unclassified message 101U. The use of override percentage 118 permits the performance (e.g., effectiveness and cost) of otherwise unused or limited use message classification rules to be evaluated and appropriately altered. Based on alterations, the frequency of use of these classification rules may be increased. For example, evaluating performance of an older rule may reveal that the older rule is now more effective due to changing SPAM patterns.

When no further rules are to be applied to unclassified message 101U, message classifier 102 can use cumulative results 113 to classify unclassified message 101U. For example, from cumulative results 113, message classifier 102 can classify unclassified message 101U as a legitimate message or as an unwanted and/or unsolicited message (e.g., SPAM), as including or not including malware, as including or not including sensitive information, etc. Message classifier 102 can output classified message 101C to indicate the classification.

Upon outputting classified message 101C, message classifier 102 can transition to classifying a next electronic message.

Figure 2:
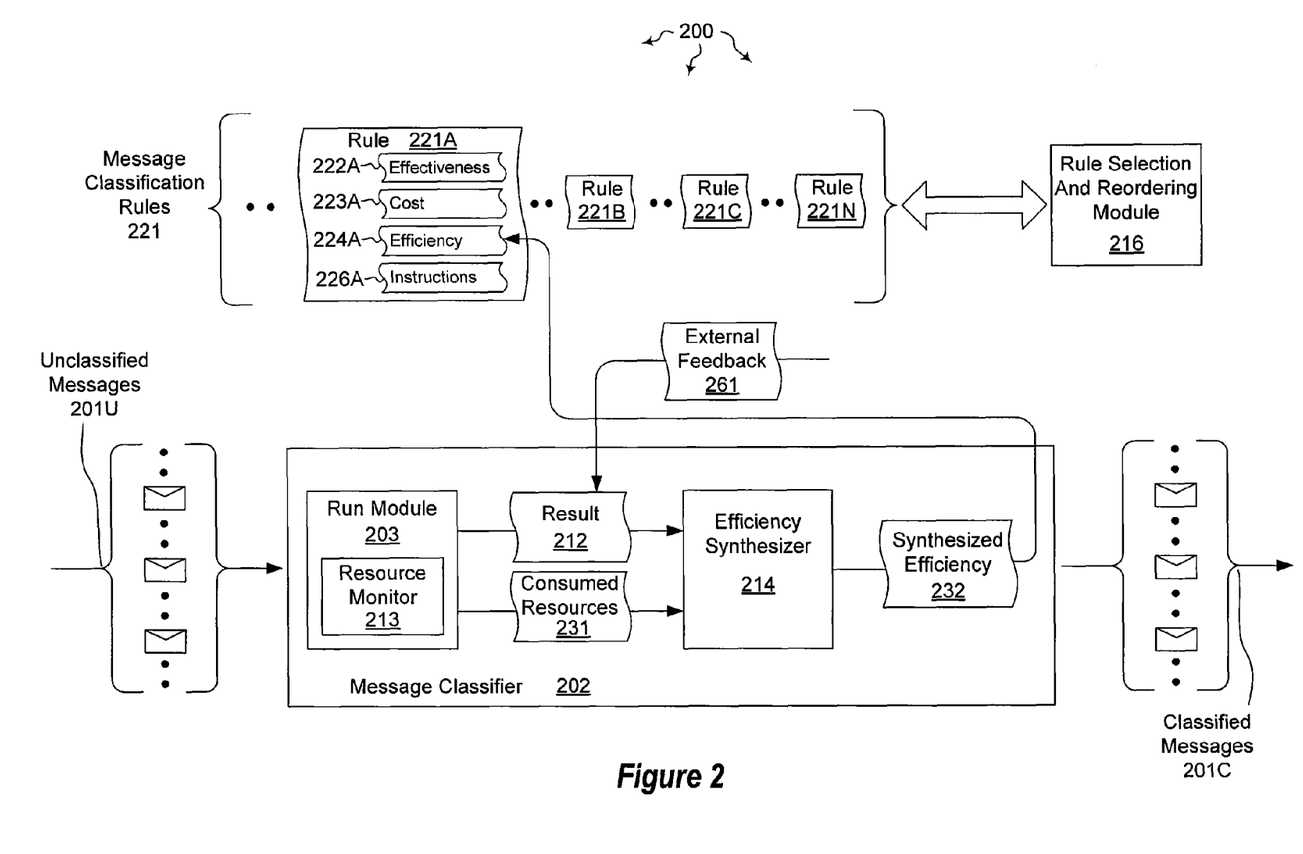
FIG. 2 illustrates an example computer architecture that facilitates adaptively selecting rules used to classify electronic messages.

FIG. 2 illustrates an example computer architecture 200 that facilitates adaptively selecting rules used to classify electronic messages. Referring to FIG. 2, computer architecture 200 includes message classifier 202, message classification rules 221, and rule selection and reordering module 216. Each of the depicted components is connected to one another over (or is part of) a network, such as, for example, a Local Area Network ("LAN"), a Wide Area Network ("WAN"), and even the Internet. Accordingly, each of the depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Rules 221 contains a plurality of message classification rules, such as, for example, rules 221A through 221N, which can be used to classify electronic messages. Similarly to rules 121, each rule in rules 221 can indicate an effectiveness, cost, efficiency, and can include instructions.

Generally, message classifier 202 is configured to classify electronic messages based on electronic message characteristics. For example, message classifier can receive unclassified messages 201U as input and generate classified messages 201C as output. Each message in classified messages 201C can be classified, for example, to indicate whether or not the message is SPAM, contains malware, contains sensitive information, etc.

As depicted, message classifier 102 includes run module 203, further including resource monitor 213, and efficiency synthesizer 214. Run module 203 is configured to run instructions (e.g., scripts or other executable code) included in a received rule. The instructions produce an individual result (potentially subject to external user feedback) that can be used as a data point to classify an electronic message. Resource monitor 213 can monitor (e.g., in essentially real-time) an amount of various consumed resources (e.g., system memory, processor, network bandwidth, etc.) during rule execution.

Efficiency synthesizer 214 can receive a result and an indication of consumed resources and synthesize an updated efficiency for an applied rule. Results and consumed resources for an applied rule can also be used to update effectiveness and/or cost for the rule for consistency with a synthesized efficiency.

As such, the cost and effectiveness of each classification rule can be measured values, measured at a particular point-in-time (e.g., when applied), and may change over time. As spam patterns and content evolve, a classification rule may become more or less effective. If a particular historical SPAM campaign experiences a resurgence in volume, an older rule may suddenly become more effective. Further, as software is upgraded and optimized, a rule's cost may decrease.

Rule selection and reordering module 216 can select rules, from message classification rules 221, for applying to an electronic message (e.g., based on efficiency). Rule selection and reordering module 216 can also sort message classification rules 221 (e.g., based on efficiency).

Figure 4:
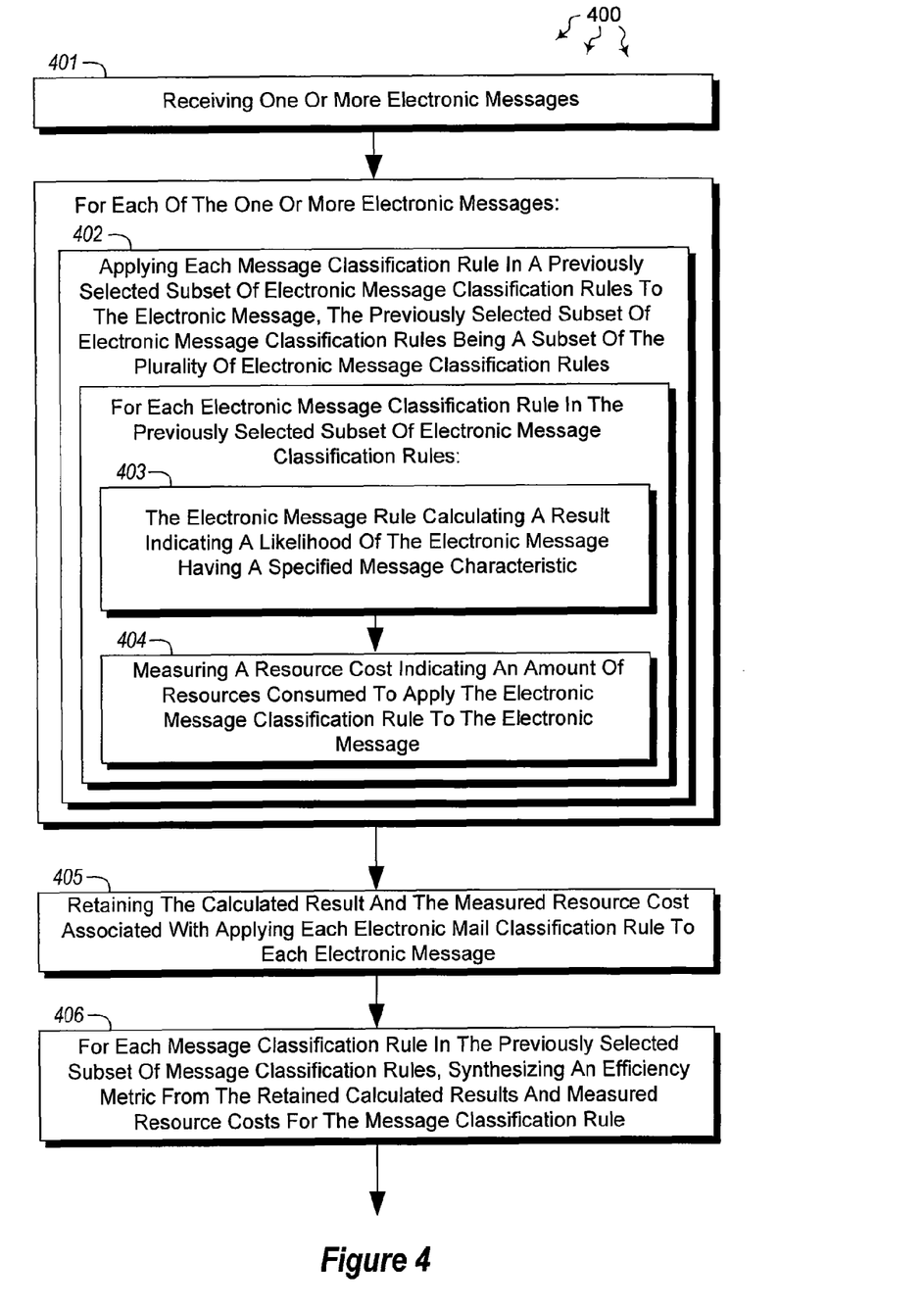
FIG. 4 illustrates a flow chart of an example method for adaptively selecting rules used to classify electronic messages.

FIG. 4 illustrates a flow chart of an example method 400 for adaptively selecting rules used to classify electronic messages. Method 400 will be described with respect to the components and data of computer architecture 200.

Method 400 includes an act of receiving one or more electronic messages (act 401). For example, message classifier 202 can receive unclassified messages 201U.

For each of the one or more electronic messages, method 400 includes an act of applying each message classification rule in a previously selected subset of electronic message classification rules to the electronic message, the previously selected subset of electronic message classification rules being a subset of the plurality of electronic message classification rules (act 402). For example, message classifier 202 can apply rules 221A-221C to each message in unclassified messages 201U (e.g., based on minimum effectiveness and maximum cost in an SLA and possibly also an override percentage).

For each electronic message classification rule in the previously selected subset of electronic message classification rules, method 400 includes an act of the electronic message rule calculating a result indicating a likelihood of the electronic message having a specified message characteristic (act 403). For example, run module 203 can execute instructions 226A against an unclassified message in 201U to generate result 212. Result 212 can indicate a likelihood of the message in 201U being an unwanted electronic message, being an infected or dangerous electronic message, containing sensitive information, etc. (e.g., based on the designated recipient of the message). Results for rules 221B and 221C can also be calculated.

External feedback (e.g., from a user) can be incorporated into a calculated result. For example, external feedback 261 can be incorporated into result 212. External feedback can raise or lower a calculated effectiveness based on the user's perception of effectiveness. When appropriate, external feedback can also be incorporated into calculated results for rules 221B and 221C.

In some embodiments, electronic messages containing uncaught SPAM, malware, or sensitive information (false negatives) as well as legitimate messages classified as including SPAM, malware, or sensitive information (false positives) are submitted for further analysis. This type of feedback can also be used to tune effectiveness scores.

For each electronic message classification rule in the previously selected subset of electronic message classification rules, method 400 includes an act of measuring a resource cost indicating an amount of resources consumed to apply the electronic message classification rule to the electronic message (act 404). For example, resource monitor 213 can measure a resource cost indicating an amount of consumed resources 231 consumed by executing instructions 226A against the message from 201U. Resource consumption costs for rules 221B and 221C can also be measured.

Method 400 includes an act of retaining the calculated result and the measured resource cost associated with applying each electronic mail classification rule to each electronic message (act 405). For example, message classifier 202 can retain result 212 and consumed resources 231 along with resource costs for executing rule 221A against other messages in unclassified messages 201U. Results and resource costs for executing rules 221B and 221C against the messages of unclassified messages 201U can also be retained.

For each message classification rule in the previously selected subset of message classification rules, method 400 includes an act of synthesizing an efficiency metric from the retained calculated results and measured resource costs for the message classification rule (act 406). Thus, for each of rules 221A, 221B, and 221C, efficiency synthesizer 214 can synthesize an efficiency metric from retained calculated results and measured resource costs. For example, for rule 221A, efficiency synthesizer 214 can synthesize synthesized efficiency 232 from result 212 and consumer resources 231 as well as from calculated results and measured resource costs from applying rule 221A to other messages in unclassified messages 201U. Efficiencies can also be synthesized for rules 221B and 221C.

Message classifier 202 can then replace 224A with synthesized efficiency with 232. Effectiveness 222A and cost 223A can also be updated as appropriate for consistency with synthesized efficiency 232. Efficiencies, effectivenesses, and costs for rules 221B and 221C can also be updated as appropriate.

Method 400 includes an act of comparing the synthesized efficiency metrics to existing efficiency metrics for electronic message classification rules included in the plurality of electronic message classification rules (act 407). For example, synthesized efficiency 232 can be compared to efficiencies contained in other of message classification rules 221. Synthesized efficiencies for rules 221B and 221C can also be compared to efficiencies contained in other message classification rules 221.

Method 400 includes an act of selecting a new subset of electronic message classification rules, from among the plurality of electronic message classification rules, for use in classifying subsequently received electronic messages based at least in part on results of comparing the synthesized efficiency metrics to existing efficiency metrics (act 408). For example, based on synthesized efficiencies, rules 221A, 221B, and 221C may become more or less efficient relative to one another as well as relative to other of message classification rules 221. As such, one or more of rules 221, 221B, and 221C may drop out when a new subset of rules (e.g., based on an SLA) is selected for classifying electronic messages.

In some embodiments, cost and effectiveness for message classification rules are continuously re-measured (e.g., throughout a day), as live measurements are taken about the relative effectiveness of each rule at classifying messages (e.g., catching SPAM, malware, sensitive information, etc.), and the actual observed costs of running the rules. For more efficient rules, there is more data about the rule's effectiveness and cost as it is run against more messages. For less efficient rules, the override percent (or random chance), such as, for example, 1%, provides that at least a baseline amount of update cost and effectiveness information is collected. As cost and effectiveness are recalculated, so is the efficiency score that is used to order the rules. Subsequent electronic messages are classified using message classification rules that are selected based on the updated scores.

As new rules are written (e.g., to catch new types of spam or malware) the size of the rule corpus grows. Newly introduced rules can be introduced with an effectiveness score of 0 and a cost score of 1, which leads to an efficiency score of 0 and places the rule at the very end of the list. Over time, as the rule is applied to messages in accordance with an override percentage, enough real-world data can eventually be accumulated to calculate more realistic values for cost and effectiveness for the new rule, and thus more appropriate efficiency scores. As the efficiency scores are recalculated, the new rules will automatically migrate to their optimal order in the list.

Over time, a rule corpus may grow too large to feasibly run based on a current override percentage (e.g., 1%). As such, another tier might be added, where rules with an efficiency score that is less than, perhaps, 0.1 are run based on a reduced override percentage, such as, for example, 0.1%. The results of such low-efficiency rules might not even be used to classify messages, but instead only used to generate updated cost and effectiveness information.

Figure 5:
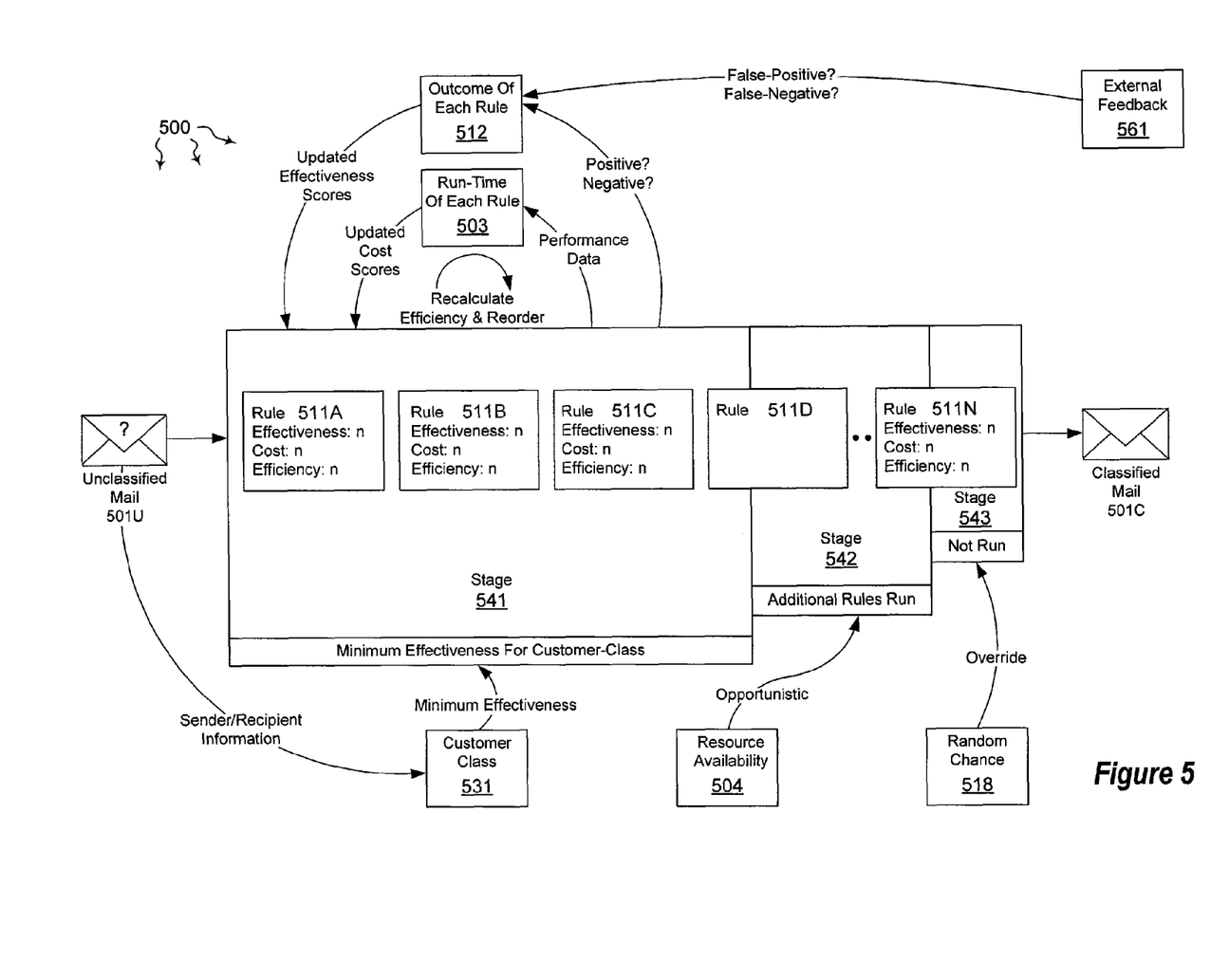
FIG. 5 illustrates another example computer architecture that facilitates adaptive electronic message scanning and adaptively selecting rules used to classify electronic messages.

FIG. 5 illustrates example computer architecture 500 that facilitates adaptive electronic message scanning and adaptively selecting rules used to classify electronic messages.

Unclassified mail 501U is received. Sender/recipient information is sent to customer class 531. Customer class 531 identifies a minimum effectiveness to use when classifying unclassified message 501U. In stage 541, minimum effectiveness for customer class 531 is achieved from running rules 511A, 511B, and 511C. In stage 542, one or more additional rules, including rule 511D, are run opportunistically as resource availability 504 permits. In stage 543, the decision to not run one or more other rules up to rule 511N is overridden based on random chance 518 and these one or other rule sup to rule 511N are run. Based on the results of rules 511A through 511N classified mail 501C (e.g., as SPAM or legitimate) is output.

Performance data is collected by the run-time of each rule 503 for rules 511A through 511N. Updated cost scores are written back into the rules 511A through 511N. The outcome of each rule 512 as positive (e.g., is SPAM) or negative (e.g., is legitimate) is determined for rules 511A through 511N.

External feedback 561 is incorporated to identify false positives and false negatives in the outcomes. Updated effectiveness scores are written back into rules 511A through 511N. Efficiencies are recalculated and rules reordered based on the recalculated efficiencies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system including a plurality of electronic message classification rules, a method for adaptively selecting rules used to classify electronic messages, the method comprising:
   an act of receiving one or more electronic messages;
   for each of the one or more electronic messages, an act of calculating a result indicating a likelihood of the electronic message having a specified message characteristic by applying each message classification rule in a previously selected subset of electronic message classification rules;
   an act of measuring a resource cost indicating an amount of resources consumed to apply each electronic message classification rule to each of the one or more the electronic messages;
   for each message classification rule in the previously selected subset of message classification rules, an act of synthesizing an efficiency metric from the calculated results and measured resource costs for the message classification rule, the efficiency metric being a metric defining the efficiency of classifying an electronic message;
   an act of comparing the synthesized efficiency metrics to existing efficiency metrics for electronic message classification rules included in the plurality of electronic message classification rules; and
   an act of selecting a new subset of electronic message classification rules, from among the plurality of electronic message classification rules, for use in classifying subsequently received electronic messages based at least in part on results of comparing the synthesized efficiency metrics to existing efficiency metrics.

2. The method as recited in claim 1, wherein the an act of selecting a new subset of electronic message classification rules comprises an act of selecting a new subset of electronic message classification rules in accordance with a Service Level Agreement ("SLA").

3. The method as recited in claim 1, wherein the act of selecting a new subset of electronic message classification rules comprises an act of reordering the plurality of plurality of electronic message classification rules based on efficiency scores.

4. The method as recited in claim 1, wherein receiving one or more electronic messages comprises receiving one or more electronic mail messages.

5. The method as recited in claim 1, wherein receiving one or more electronic messages comprises receiving one or more Short Message Service ("SMS") messages.

6. The method as recited in claim 1, wherein receiving one or more electronic messages comprises receiving one or more files.

7. The method as recited in claim 1, wherein the plurality of electronic message classification rules are used to classify electronic messages as SPAM or as legitimate.

8. The method as recited in claim 1, wherein the plurality of electronic message classification rules are used to classify electronic messages as containing malware or not containing malware.

9. The method as recited in claim 1, wherein the plurality of electronic message classification rules are used to classify electronic messages as containing sensitive digital information or not containing sensitive digital information.

10. At a computer system including one or more processors and system memory, the computer system including a plurality of electronic message classification rules, a method for adaptively selecting rules used to classify electronic messages, the method comprising:
    an act of receiving one or more electronic messages;
    for each of the one or more electronic messages:
        an act of applying each message classification rule in a previously selected subset of electronic message classification rules to the electronic message, the previously selected subset of electronic message classification rules being a subset of the plurality of electronic message classification rules;
        for each electronic message classification rule in the previously selected subset of electronic message classification rules:
            an act of the electronic message rule calculating a result indicating a likelihood of the electronic message having a specified message characteristic;
            an act of measuring a resource cost indicating an amount of resources consumed to apply the electronic message classification rule to the electronic message;
    an act of retaining the calculated result and the measured resource cost associated with applying each electronic mail classification rule to each electronic message;
    for each message classification rule in the previously selected subset of message classification rules, an act of synthesizing an efficiency metric from the retained calculated results and measured resource costs for the message classification rule, the efficiency metric being a metric defining the efficiency of classifying an electronic message;
    an act of comparing the synthesized efficiency metrics to existing efficiency metrics for electronic message classification rules included in the plurality of electronic message classification rules; and
    an act of selecting a new subset of electronic message classification rules, from among the plurality of electronic message classification rules, for use in classifying subsequently received electronic messages based at least in part on results of comparing the synthesized efficiency metrics to existing efficiency metrics.

11. The method as recited in claim 10, further comprising, prior to applying each message classification rule in a previously selected subset of electronic message classification rules, an act of selecting the selected subset of electronic message classification rules based on calculated efficiency scores.

12. The method as recited in claim 10, further comprising:
    an act of receiving external feedback related to applying at least one message classification rule to an electronic message; and
    an act of incorporating the external feedback into the calculated result from applying the at least one message classification rule to the electronic message.

13. The method as recited in claim 12, wherein the received external feedback indicates that the calculated result from applying the at least one message classification rule to the electronic message is one of: a false negative or a false positive.

14. The method as recited in claim 12, further comprising an act of updating an effectiveness score for the at least one message classification rule based on the calculated result incorporating the external feedback.

15. The method as recited in claim 10, wherein the an act of selecting a new subset of electronic message classification rules comprises an act of selecting a new subset of electronic message classification rules in accordance with a Service Level Agreement ("SLA").

16. The method as recited in claim 10, wherein the act of selecting a new subset of electronic message classification rules comprises an act of reordering the plurality of plurality of electronic message classification rules based on efficiency scores.

17. A system for adaptively selecting SPAM detection rules, the system comprising:
one or more processors;
system memory;
one or more computer storage media having stored thereon a plurality of SPAM detection rules and having stored thereon executable instructions representing a message classifier and a rule selection and reordering module, wherein the message classifier is configured to:
receive one or more electronic mail messages;
for each of the one or more electronic mail messages, apply each SPAM detection rule in a previously selected subset of SPAM detection rules to the electronic mail message, the previously selected subset of SPAM detection rules being a subset of the plurality of SPAM detection rules; and
for each SPAM detection rule in the previously selected subset of SPAM detection rules:
calculate a result indicating a likelihood of the electronic mail message being SPAM;
measure a resource cost indicating an amount of resources consumed to apply the SPAM detection rule to each of the one or more electronic mail messages; and
synthesize an efficiency metric from the calculated results and measured resource costs for the SPAM detection rule, the efficiency metric being a metric defining the efficiency, based on a quotient of the calculated results and measured resource costs, of classifying an electronic message as SPAM; and
wherein the rule selection and reordering module is configured to:
compare the synthesized efficiency metrics to existing efficiency metrics for SPAM detection rules included in the plurality of SPAM detection rule rules; and
select a new subset of SPAM detection rules for use in classifying subsequently received electronic mail messages based at least in part on results of comparing the synthesized efficiency metrics to existing efficiency metrics.

18. The system as recited in claim 17, wherein the wherein the rule selection and reordering module being configured to select a new subset of SPAM detection rules comprises the rule selection and reordering module being configured to select a new subset of SPAM rules in accordance with a Service Level Agreement ("SLA").

19. The system as recited in claim 17, wherein the wherein the rule selection and reordering module being configured to select a new subset of SPAM detection rules comprises the rule selection and reordering module being configured to reorder the plurality of SPAM classification rules based on efficiency scores.

20. The system as recited in claim 17, wherein the message classifier being configured to receive one or more electronic mail messages comprises the message classifier being configured to receive electronic mail messages from the Internet.

* * * * *